United States Patent
Kapur et al.

(10) Patent No.: US 7,827,490 B2
(45) Date of Patent: Nov. 2, 2010

(54) MEDIA STATE USER INTERFACE

(75) Inventors: Jay Kapur, Redmond, WA (US); Peter D. Rosser, Renton, WA (US); Kort Sands, Seattle, WA (US); Jeff Fong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 11/606,491

(22) Filed: Nov. 30, 2006

(65) Prior Publication Data

US 2008/0134036 A1    Jun. 5, 2008

(51) Int. Cl.
*G06F 3/00* (2006.01)

(52) U.S. Cl. .................. 715/716; 715/719; 715/776; 715/751; 715/723

(58) Field of Classification Search ................. 715/716, 715/719, 776, 751, 723
See application file for complete search history.

(56) References Cited

U.S. PATENT DOCUMENTS

| | | | |
|---|---|---|---|
| 5,717,869 A * | 2/1998 | Moran et al. ................. | 715/716 |
| 6,366,296 B1 * | 4/2002 | Boreczky et al. ............ | 715/719 |
| 6,452,615 B1 * | 9/2002 | Chiu et al. ................... | 715/776 |
| 6,744,967 B2 | 6/2004 | Kaminski et al. | |
| 6,847,778 B1 * | 1/2005 | Vallone et al. ................ | 386/68 |
| 7,030,872 B2 * | 4/2006 | Tazaki ......................... | 345/418 |
| 7,290,698 B2 * | 11/2007 | Poslinski et al. ............. | 235/375 |
| 2001/0055017 A1 | 12/2001 | Ording | |
| 2002/0075572 A1 | 6/2002 | Boreczky et al. | |
| 2003/0068161 A1 | 4/2003 | Lasorsa et al. | |
| 2003/0121055 A1 | 6/2003 | Kaminski et al. | |
| 2004/0266337 A1 | 12/2004 | Radcliffe et al. | |
| 2004/0268400 A1 | 12/2004 | Barde et al. | |
| 2005/0166136 A1 | 7/2005 | Capps et al. | |
| 2005/0183017 A1 | 8/2005 | Cain | |
| 2006/0013555 A1 | 1/2006 | Poslinski | |
| 2006/0020966 A1 | 1/2006 | Poslinski | |
| 2006/0045470 A1 | 3/2006 | Poslinski et al. | |
| 2006/0080716 A1 | 4/2006 | Nishikawa et al. | |

(Continued)

FOREIGN PATENT DOCUMENTS

EP    1022648 A2    7/2000

(Continued)

OTHER PUBLICATIONS

Kamvar, et al., "MiniMedia Surfer: Browsing Video Segments on Small Displays," Date: Apr. 24, 2004-Apr. 29, 2004, http://www.fxpal.com/publications/FXPAL-PR-04-270.pdf.

(Continued)

*Primary Examiner*—Tadesse Hailu
*Assistant Examiner*—Michael Roswell

(57) ABSTRACT

A media state user interface (UI) indicates a section of past recorded content corresponding to content prior in time sequence to the current viewing position via a first visual element and a section of future recorded content corresponding to content post in time sequence to the current viewing position via a second visual element. The first and second visual elements are visually distinguishable, for example, through the presentation of each visual element in a contrasting color. Adjacent ends of the visual elements abut at an interface. The interface visually represents the current viewing position within the media content. A third visual element in the form of a position indicator tracks the current viewing position at the interface and provides additional information regarding playback and other manipulation of the media content.

20 Claims, 8 Drawing Sheets

U.S. PATENT DOCUMENTS

2006/0168298 A1 7/2006 Aoki et al.
2006/0168631 A1 7/2006 Nishikawa et al.
2006/0188229 A1 8/2006 Yamagata et al.

OTHER PUBLICATIONS

Richter, et al., "A Multi-Scale Timeline Slider for Stream Visualization and Control," http://www-static.cc.gatech.edu/fce/c2000/pubs/tech/GIT-GVU-99-30.pdf.

International Search Report, PCT/US2007/083557, Jan. 16, 2008, pp. 1-13.

SnaZio* TvPVR User & Installation Guide, published by V-One Multimedia, downloaded Sep. 4, 2006 from http://www.snazzizone.com/Guide/SnaZio%20TvPVR%20Guide-Updated.pdf.

Extended EPO Search Report for Application No. PCT/US2007/083557 Mailed Nov. 20, 2009, pp. 1-8.

European Patent Office Communication regarding Application No. 07844860.2 dated Jan. 26, 2010.

Office Action received from The State Intellectual Property Office of The People's Republic of China regarding Application No. 200780043939.4 dated Jun. 23, 2010.

\* cited by examiner

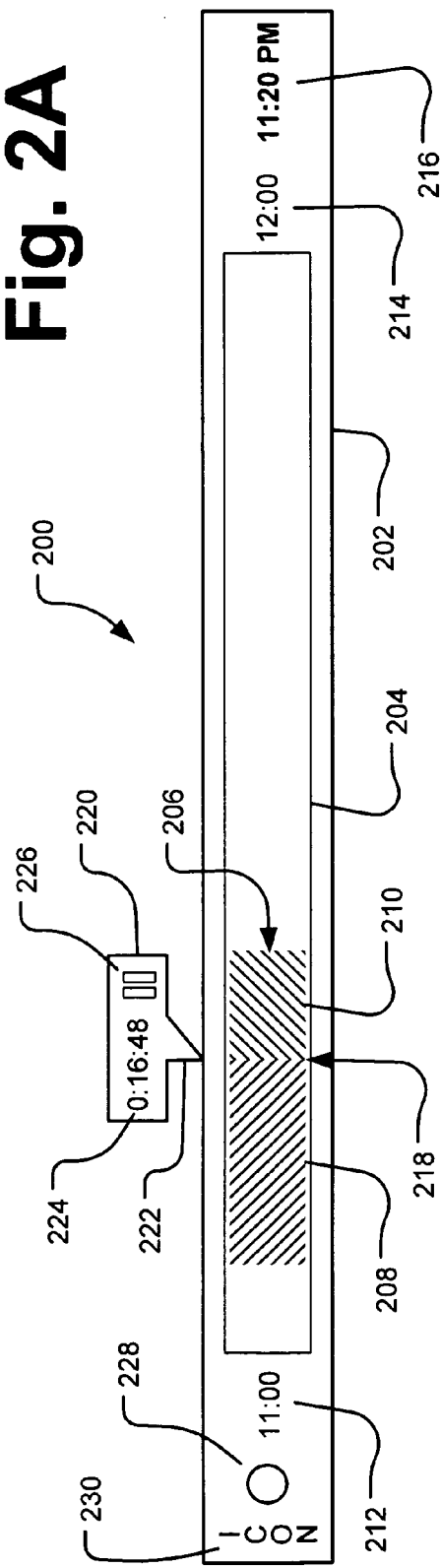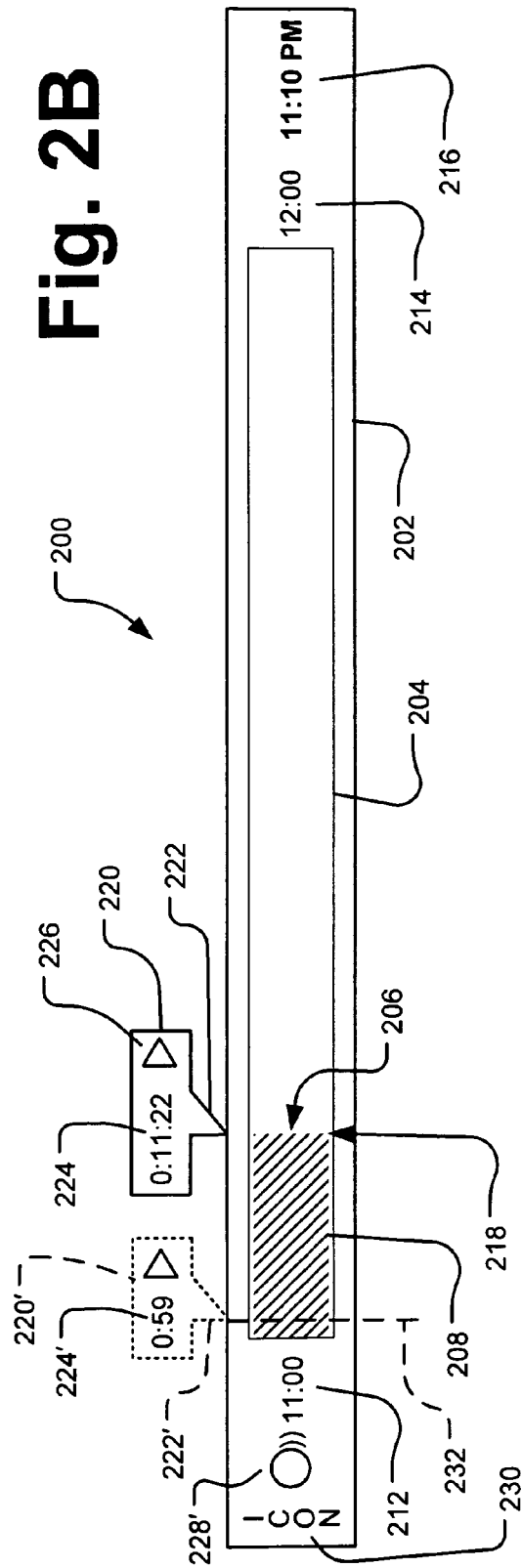

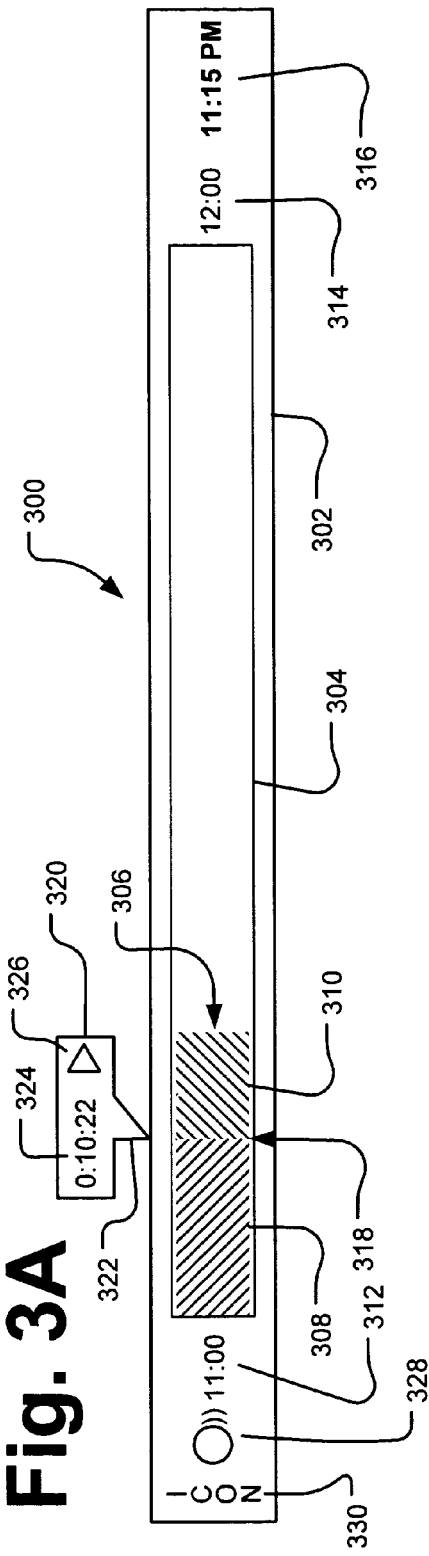
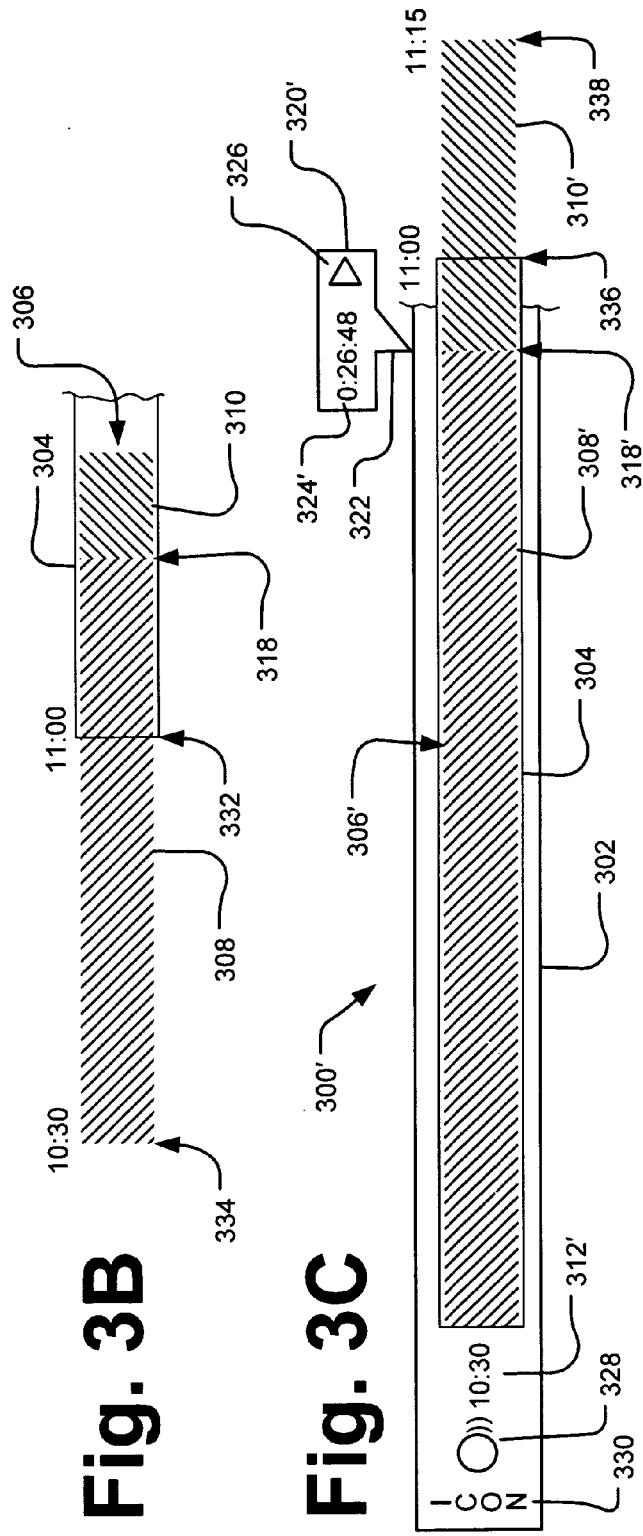
Fig. 3A
Fig. 3B
Fig. 3C

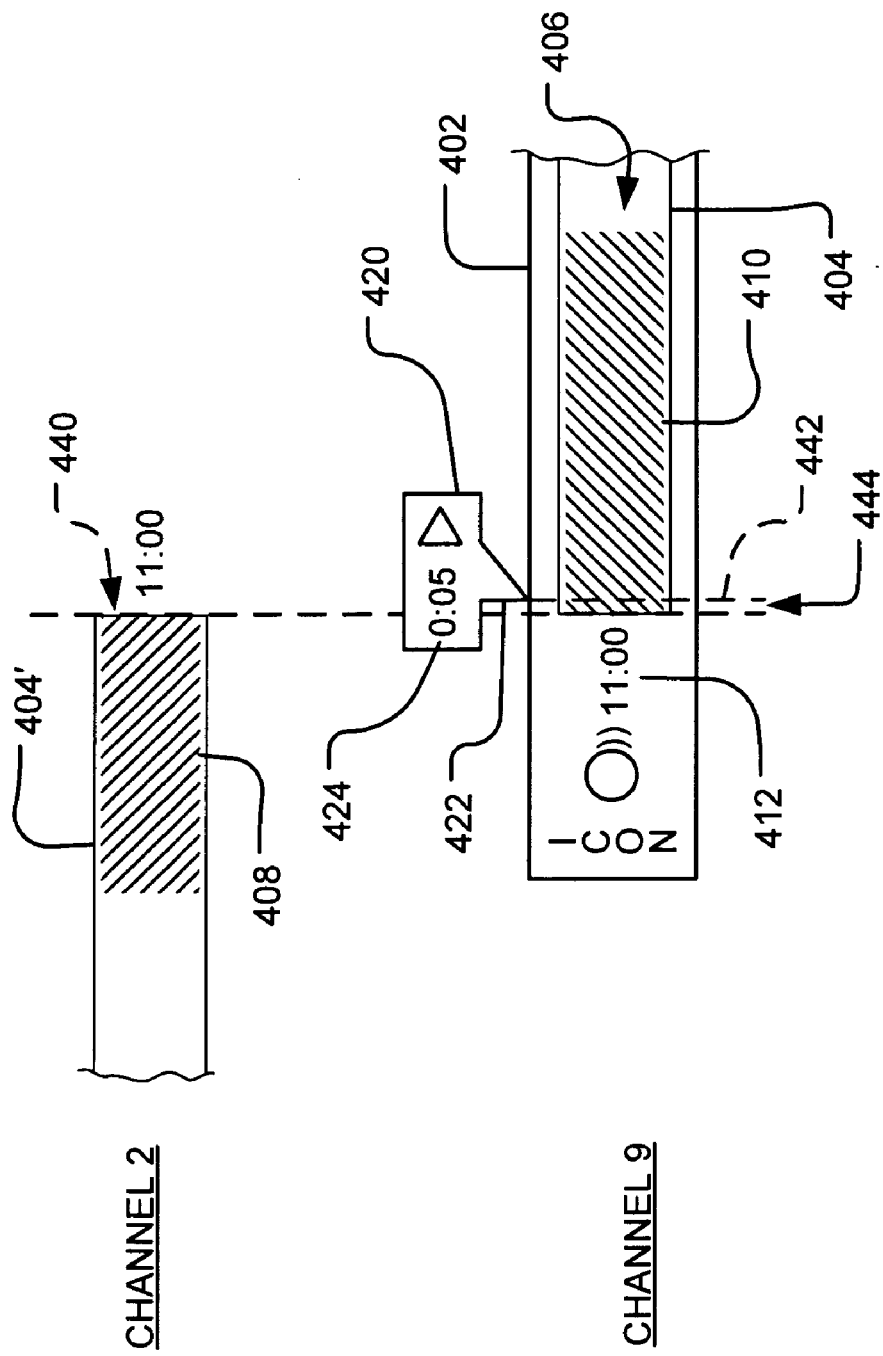

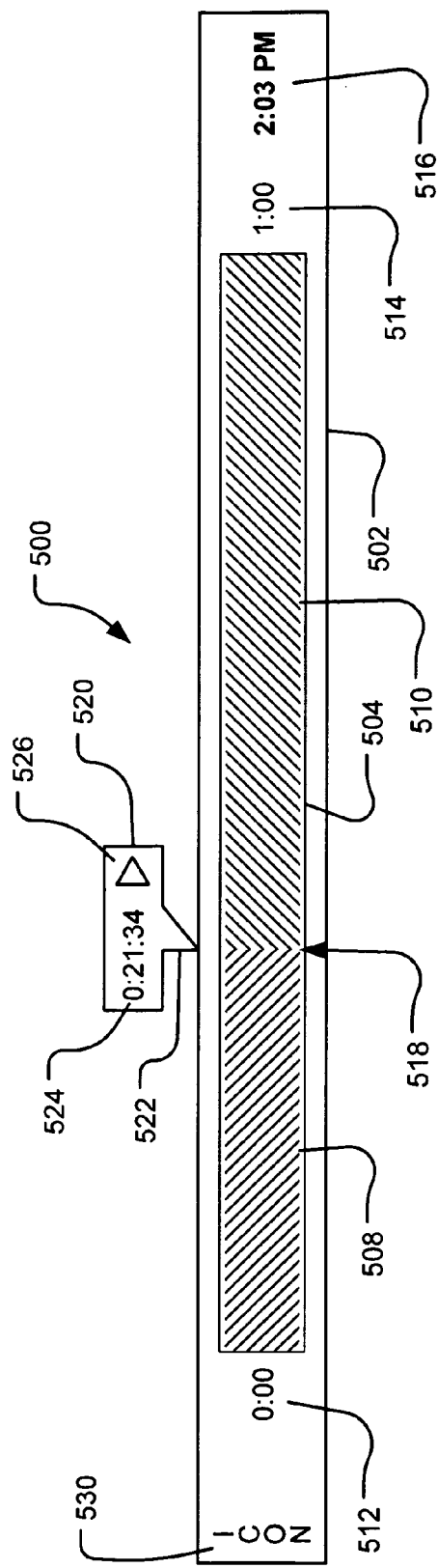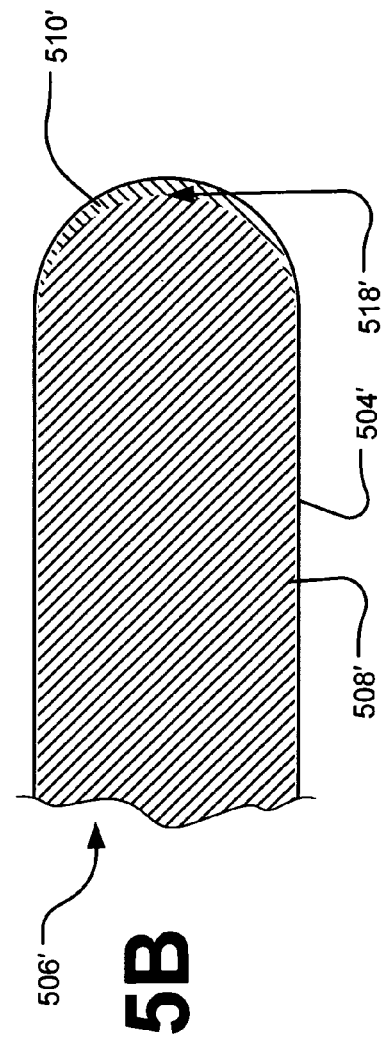
Fig. 5A
Fig. 5B

MEDIA STATE USER INTERFACE

BACKGROUND

Time-shifting of broadcast program content was originally made available to viewers with the advent of video cassette recorders that allow viewers to record broadcast content for later playback at the viewer's convenience. Advances in digital recording technology now allow a viewer to record a broadcast program in real-time while simultaneously watching a previously recorded portion of the same program. In such a situation, a user of a digital video recorder device that buffers broadcast content in real-time, may become confused as to whether she is viewing live television or whether she is viewing time-shifted program material stored in the buffer of the device. If the viewer is watching time-shifted program material, it may be beneficial for her to know how large the buffer is and what the current viewing position within the buffer is.

SUMMARY

A media state user interface (UI) is described herein that allows a viewer to easily understand through a combination of visual elements a current viewing position within a presentation of prerecorded or live media content, or a combination of both. The media state UI indicates a section of past recorded content corresponding to content prior in time sequence to the current viewing position via a first visual element. The media state UI also indicates a section of future recorded content corresponding to content post in time sequence to the current viewing position via a second visual element. The first and second visual elements are visually distinguishable, for example, through the presentation of each visual element in a contrasting color. In one implementation described herein, the first and second visual elements are in the form of rectangular bars. Adjacent ends of the visual elements abut at an interface. The interface thus visually represents the current viewing position within the media content. A third visual element in the form of a position indicator may track the interface position and provide additional information to the viewer regarding playback and other manipulation of the media content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTION OF THE DRAWINGS

FIG. 2A is a schematic diagram of one state of an implementation of a media state UI.

FIG. 2B is a schematic diagram of another state of the media state UI of FIG. 1.

FIG. 3A is a schematic diagram of another state of the media state UI of FIG. 1.

FIG. 3B is a schematic diagram of an alternate state of the media state UI of FIG. 3A.

FIG. 3C is a schematic diagram of an additional alternate state of the media state UI of FIG. 3A.

FIG. 4 is a schematic diagram of another implementation of a media state UI.

FIG. 5A is a schematic diagram of an implementation of a media state UI for use in representing the state of prerecorded media content.

FIG. 5B is a schematic diagram of an implementation of a media state UI detailing a bar interface between two visual elements of the media state UI approaching an edge of a buffer container boundary.

DETAILED DESCRIPTION

Figure 1:
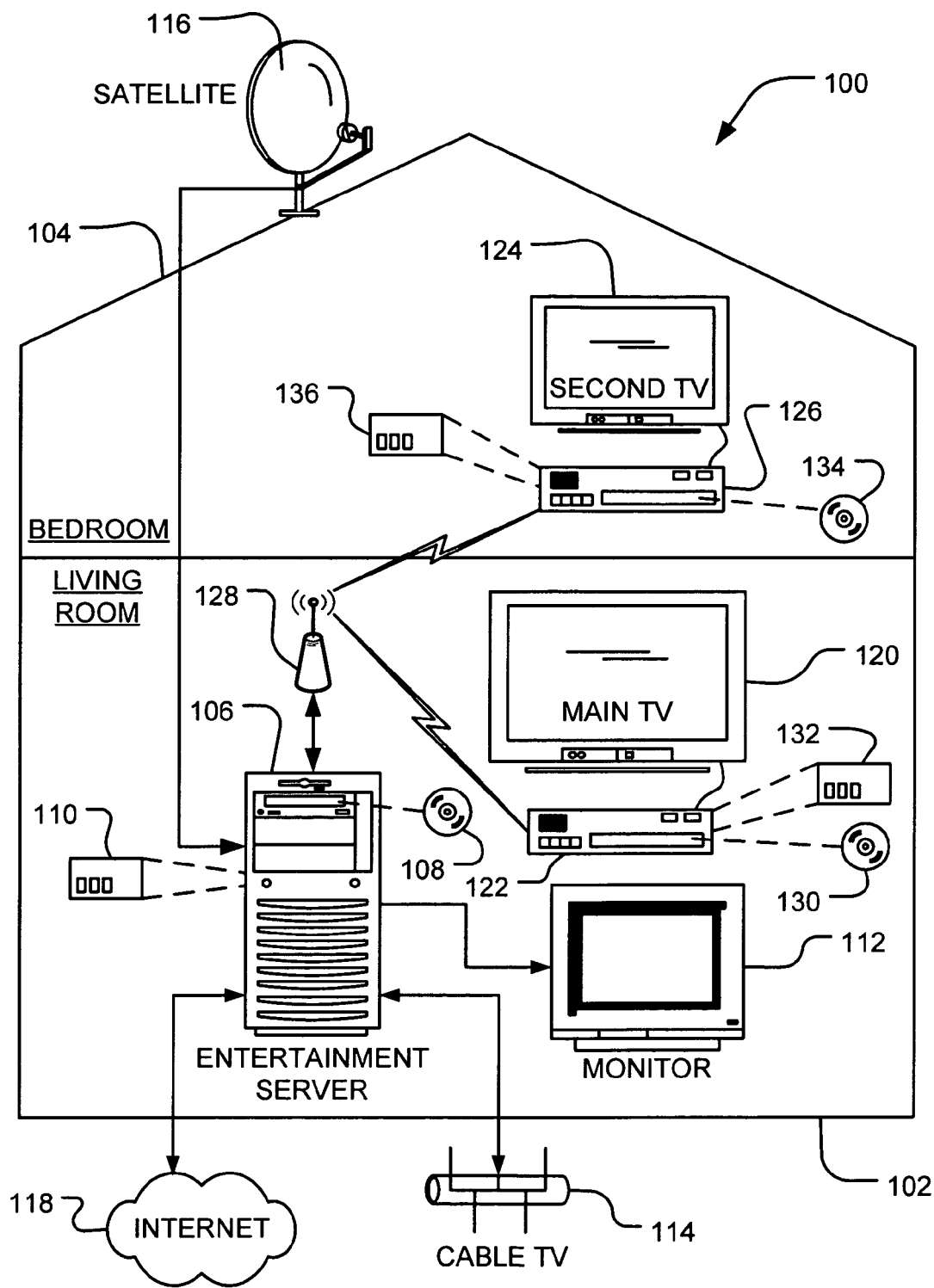
FIG. 1 is a schematic diagram of a home media system centered around a media server.

Presentation of digitally recorded, time-shifted media and a related media state UI on a presentation device may be understood in the context of a media network. FIG. 1 depicts an exemplary home entertainment media network 100 with components positioned throughout a house, e.g., in a living room 102 and a bedroom 104. Central to the media network 100 is a media server 106, in this implementation situated in the living room 102, but it could be located anywhere within the house. In one implementation, the media server 106 may be a conventional personal computer (PC) configured to run a multimedia software package, for example, the Windows® XP Media Center Edition operating system (Microsoft Corporation, Redmond Wash.). In such a configuration, the media server 106 is able to integrate full computing functionality with a home entertainment system within a single PC. For example, a user can watch television (TV) in one graphical window of a video monitor, while sending e-mail or working on a spreadsheet in another graphical window on the same monitor. In addition, the media server 106 may also include other features or components, for example: a personal video recorder (PVR) to capture live TV shows for future viewing or to record the future broadcast of a single program or series; a compact disc (CD) or digital video disc (DVD) drive 108 for disc media playback; a memory drive 110 for integrated storage of and access to a user's recorded content, such as TV shows, songs, pictures, and home videos; and an electronic program guide (EPG).

Instead of a conventional PC, the media server 106 may comprise a variety of other devices capable of storing and distributing media content including, for example, a notebook or portable computer, a tablet PC, a handheld media player (e.g., an MP3 player), a smart phone device, a workstation, a mainframe computer, a server, an Internet appliance, or combinations thereof. The media server 106 may also be a set-top box capable of delivering media content to a computer where it may be streamed, or the set-top box itself could stream the media content. As the media server 106 may be a full function computer running an operating system, the user may also have the option to run standard computer programs (e.g., word processing and spreadsheets), send and receive e-mails, browse the Internet, or perform other common functions.

In addition to storing media content, the media server 106 may be connected with a variety of media sources, for example, a cable TV connection 114, a satellite receiver 116, an antenna (not shown for the sake of graphic clarity), and/or a network such as the Internet 118. A user may thus control a live stream of media content (e.g., TV content) received, for example, via the cable connection 114, the satellite receiver 116, or antenna. This capability is enabled by one or more tuners residing in the media server 106. The one or more tuners may alternatively be located remote from the media server 106. In either case, the user may choose a tuner to fit any particular preferences. For example, a user wishing to watch both standard definition (SD) and high definition (HD) content may employ a tuner configured for both types of contents. Alternately, the user may employ an SD tuner for SD content and an HD tuner for HD content separately.

The TV content may be received as an analog (i.e., radio frequency) signal or a digital signal (e.g., digital cable). The received TV content may include discrete content packets, where each content packet includes actual TV content (i.e., audio and video data) and a policy or policies associated with the actual TV content. If TV content is received as an analog signal, discrete content packets may be created from the analog signal.

Digital rights management (DRM) policies may be employed to protect the actual TV content or video content digitally stored on the media server 106. Licenses may therefore be associated with the actual TV or video content. A license identifies keys used to decrypt video and TV content (e.g., content packets) that are encrypted as part of DRM. In particular, the keys are used to allow consumption or use of the actual video and TV content. In certain implementations, the content packets of received TV content may be encrypted or compressed. Encrypted content packets are typically decrypted with keys transmitted to or resident at the playback device or home network devices 122, 126.

The media network 100 may also include one or more network devices functioning as media receivers 122, 126 placed in communication with the media server 106 through a network 128, for example, a local area network (LAN). In an exemplary embodiment, the media receivers 122, 126 may be a Media Center Extender device, for example, an Xbox 360™ (Microsoft Corporation, Redmond, Wash.). The media receivers 122, 126 may also be implemented as any of a variety of conventional media rendering or computing devices, including, for example, a digital video recorder (DVR) (a/k/a a personal video recorder (PVR)), a set-top box, a television, a video gaming console, a desktop PC, a notebook or portable computer, a workstation, a mainframe computer, an Internet appliance, a handheld PC, a cellular telephone or other wireless communications device, a personal digital assistant (PDA), or combinations thereof. Each of the media receivers 122, 126 may additionally have optical disc drives 130, 134, respectively, for compact disc (CD) or digital video disc (DVD) media playback. Each of the media receivers 122, 126 may also have memory drives 132, 136, respectively, to allow the media receivers 122, 126 to function as a PVR. Furthermore, the media receivers 122, 126 may include a tuner as described above.

The network 128 may comprise a wired and/or wireless network, for example, cable, Ethernet, WiFi, a wireless access point (WAP), or any other electronic coupling means, including the Internet. The network 128 may enable communication between the media server 106, the media receivers 122, 126, and any other connected device through packet-based communication protocols, such as transmission control protocol (TCP), Internet protocol (IP), real-time transport protocol (RTP), and real-time transport control protocol (RTCP). Communications may be transmitted directly between devices over a LAN, or they may be carried over a wide area network (WAN), for example, the Internet 118.

One or more presentation devices, for example a main TV 120 in the living room 102, a secondary TV 124 in the bedroom 104, and a video monitor 112 may be situated throughout the home environment 100. These video display devices may be connected with the media server 106 via the network 128 either directly or via the media receivers 122, 126. As shown in the example of FIG. 1, the main TV 120 and the secondary TV 124 may be coupled to the media receivers 122, 126 through conventional cables. The video monitor 112 may be coupled with the media server 106 directly via a video cable. The media server 106 and media receivers 122, 126 may also or alternatively be coupled with any of a variety of video and audio presentation devices. Media content including TV content may thus be supplied to each of the video display devices 112, 120, 124 over the home network 128 from the media server 106 situated in the living room 104.

The media receivers 122, 126 may be configured to receive streamed media content, including video and TV content, from the media server 106. Media content, and particularly video and TV content, may be transmitted from the media server 106 to the media receivers 122, 126 as streaming media comprised of discrete content packets via any of the network protocols described above. The streamed media content may comprise video IP, SD, and HD content, including video, audio, and image files, decoded on the home network devices 122, 126 for presentation on the connected TVs 120, 124. The media content may further be "mixed" with additional content, for example, an EPG, presentation content related to the media content, a web browser window, and other UI environments transmitted from the media server for output on the TVs 120, 124 or the monitor 112. Such additional media content may be delivered in a variety of ways using different protocols, including, for example, standard remote desktop protocol (RDP), graphics device interface (GDI), or hypertext markup language (HTML).

In addition to the media receivers 122, 126 and the video display devices 112, 120, 124, the media server 106 may be connected with other peripheral devices, including components such as digital video recorders (DVR), cable or satellite set-top boxes, speakers, and a printer (not shown for the sake of graphic clarity). The media server 106 may also enable multi-channel output for speakers. This may be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM) surround decoding.

A media state UI may be incorporated into software applications or an operating system operating within or over the media network. In general, a media state UI may be used to provide a consumer or viewer of media presented by the media network a temporal and functional context for the media presentation. For example, a media state UI may indicate to the user that the presented media is a live broadcast or a playback of previously recorded material. Additionally, a media state UI may indicate whether the media playback is presently playing, paused, in a fast forward mode, in a fast reverse mode, or in some other sort of "trick" play mode effectuated by the viewer via control of a DVR, DVD player, or other media source or delivery device, e.g., via a remote control. It should be noted that while most of the examples described herein relate to presentation of video or other visually perceptible media, the media state UI may similarly used as a visual indication of the status and control of the presentation of live or prerecorded audio content.

Further, a media state UI may indicate to a viewer a current viewing position within a prerecorded media segment and also thereby indicate the beginning and end of such a recorded media segment in relative terms. Such indications of beginning, end, and current position may be presented as relative visual depictions or actual time calculations of the length of a stored media segment, or a combination of both. A media state UI may further indicate the length of a buffered segment of content stored, for example, on a DVR, during the course of viewing a broadcast program for present of later time shifting. A media state UI can provide other or additional information regarding the state of the presentation to a viewer as may be desired.

FIG. 2A depicts a media state UI 200 according to one implementation of the technology. The media state UI 200 may be based upon a state bar 202. The state bar 202 may be in the form of a rectangular bar of color overlaid on a video presentation (e.g., a television show or movie) on a typical presentation device as described above. The state bar 202 may be dynamically sized to fit within the viewing area of any particular presentation device regardless of the size, definition, or aspect ratio of the screen. In one implementation, the state bar 202 may be configured to expand or contract in length to maintain a consistent percentage gap between the lateral edges of the state bar 202 and the edges of the display area of the presentation device. While the length of the state bar 202 may significantly expand or contract depending upon the width of the display of the presentation device, it may be appropriate to limit the expansion and contraction of the height of the state bar 202 in order to maintain and insure the readability of the information contained within the state bar 202.

A buffer container 204 may be positioned within the state bar 202. The buffer container 204 maybe an elongated rectangular area within the state bar 202 and may be visually identified as merely a box or it maybe presented as a bar of contrasting color to the color of the state bar 202. A buffer bar 206 may further be displayed within the buffer container. A program start time indicator 212 and a program end time indicator 214 may be provided within the state bar 202 on each end of the buffer bar 204, respectively. A clock 216 presenting the actual time may be presented within the state bar 202, for example, adjacent the program end time 214 on the right side of the state bar 202. The state bar 202 may further include a recording indicator 228, for example, at the left end of the state bar 202 adjacent the program start time 212. The left end of the state bar 202 may further include an area for placement of an icon 230, logo, or other identification information as desired by the designer of the media state UI 200.

The buffer container 204 and the buffer bar 206 may be used to indicate several pieces of information to a viewer. The buffer container 204 may indicate to a viewer the relative length of the media presently being presented. In the implementation of FIG. 2A, the buffer container 204 operates within a date/time mode, wherein any time values are initially expressed as a time of day and may be indicative of a program time slot for a particular television program. The term "program time slot" is intended to indicate a scheduled time period for a broadcast program, inclusive of any commercial advertisements, and usually measured in half-hour or hour increments, or longer. The program time slot data may be accessed from an external source, for example, an EPG. In the example of FIG. 2A, the media program being viewed is an hour in duration as indicated by the program start time 212 of 11:00 and the program end time 214 of 12:00. In a case where there is no EPG data for a live broadcast, the media state UI 200 may present a default program time slot (e.g., a half-hour or one hour) and then ask the viewer whether the default program time slot should be changed to a different value.

For a particular presentation display, the indicators 212, 214 may change to reflect different program time slot lengths, for example, a half hour period for a situation comedy or a two hour period for a movie as indicated by the EPG. The day/time values corresponding to a particular program time slot may be converted to a time span value, wherein the program start time 212 is defined as 0 and the time values are expressed as an elapsed time from zero.

Regardless of the time span of the program time slot indicated by the program start time 212 and the program end time 214, the length of the buffer container 204 may remain constant. Also it should be noted that in the case of a viewer watching or listening to a media program composed of entirely pre-recorded content, the program time indicators 212, 214 may reflect the actual time that the particular media program originally aired according to the EPG, and may not bear any relation to present time indicated by the clock 216.

As previously noted, the buffer bar 206 is presented within the buffer container 204. The buffer bar 206 may be composed of one or both of two visual elements, a first visual element representing a past content bar 208 and a second visual element representing a future content bar 210. Each of the past content bar 208 and the future content bar 210 may appear as contrasting bars of color, patterns, or other distinguishable visual indicators that reside within the buffer container 204 and may extend to fill the full height of the buffer container 204. Also, in certain instances as described further below, the buffer bar 206 may fill the entire length of the buffer container 204.

As shown in FIG. 2A, the right edge of the past content bar 208 abuts the left edge of the future content bar 210 such that the contrasting colors defining the past content bar 208 and the future content bar 210 meet at an interface 218. For clarity and to prevent confusion with references to "user interfaces," "graphic interfaces," "communication interfaces," and other types of interfaces described herein, the interface between the past content bar 208 and the future content bar 210 will hereinafter be referred to as "bar interface 218." The bar interface 218 between the past content bar 208 and the future content bar 210 thus indicates a current viewing position. The bar interface 218 thereby functions as a visual indicator to the viewer of the current playback position within pre-recorded media content presently being viewed. Further, the contrasting appearance of the buffer container 204 acts as another visual element to indicate the entire length of the relevant program time slot, i.e., the total duration of the media content being presented. If the buffer bar 206 extends the length of the buffer container 204, then the visual contrast of the buffer container 204 may be completely obfuscated.

In some implementations, the position of the bar interface 218 may be restricted to discrete increments along the media state bar 202 in order to avoid a flicker effect between the first contrasting edge of the past content bar 208 and the second contrasting edge of the future content bar 210 at the bar interface 218. A flicker effect may generally be described as an alternating appearance of the edge of the past content bar 208 and the edge of the future content bar 210 on the same line of pixels of the display device. Flicker effects can occur on display devices due to certain characteristics of the display, for example, the resolution and scan type. For example, an enhanced definition, high resolution, interlaced display will create a flicker at the bar interface 218 unless the position of the bar interface 218 is limited to incrementing every other pixel row and every other pixel column.

In one implementation, the media state UI 200 may be configured to snap the adjacent ends of the past content bar 208 and the future content bar 210 to small, predetermined pixel increments along the display, thereby creating a smooth, flicker-free movement of the bar interface 218. The increments may be determined as percent increments of the duration of the time span for a particular program time slot, with the entire duration valued at 100%. The position of the bar interface 218 may be determined as a percentage of the duration. If each unit of time in a time span is considered a "tick" (i.e., 1 tick=100 nanoseconds), a percentage position may equal the elapsed playback time divided by the duration in units of ticks. The movement of the bar interface 218 may then be smoothed by incrementing (or decrementing) to such percentage increments, which are independent of the screen size or resolution. Additionally, if the left end of the past content bar 208 or the right end of the future content bar 210 are within a certain percentage distance of the respective end of the buffer container 204, the media state UI 200 may be designed to snap the end of the past content bar 208 or the future content bar 210 to the end of the buffer container 204 to abut the edge of the media state bar 202 at the respective end.

The length of each of the past content bar 208 and the future content bar 210 is indicative of the recorded portion of the program presently being presented, for example, stored in memory on a DVR. In the implementation of FIG. 2A, the left edge of the past content bar 208 does not extend to the left edge of the buffer container 204. This indicates that recording of the present program did not begin at the start of the program time slot, but was instead initiated at some point after the broadcast of the program began. The future content bar 210 similarly does not extend to the far right edge of the buffer container 204. The attenuated future content bar 210 could be indicative of a termination of the recording process before the end of the program time slot was reached during an original broadcast.

In this instance, however, the program is still being broadcast. This determination can be made by a viewer based upon the relationship between the values of the program time indicators 212, 214 and the clock 216, which in this example indicates 11:20 p.m. and is between the values of the program time indicators 212, 214. Further, the right edge of the future content bar 210 visually indicates that at the present program has been recorded up until the present time indicated on the clock 216. Continued recording of the present program may be indicated by the continued growth of the future content bar 210 to the right within the buffer container 204 as the actual time indicated on the clock 216 advances.

As noted, the fact that the buffer bar 206 does not fill the entire length of the buffer container 204 indicates that some period less than the entire length of the program has been recorded. However, in the instance that an entire program was previously recorded and is presently being viewed, the buffer bar 206 would extend laterally to fill the entire length of the buffer container 204.

As a viewer controls the playback options for a particular media presentation, for example, play, pause, slow play, slow reverse play, fast play, slow reverse play, fast forward, fast reverse, skipping, or by actuating other trick functions available through the DVR or other playback device, the presentation of the state bar 202 may dynamically change to reflect such playback controls. Generally, as the viewing position advances within the buffer container 204 the future content bar 210 decreases in size and the past content bar 208 increases in size commensurate with the speed of advance of the viewing position. Similarly, as the viewing position retreats, the decreases in size and the first element future content bar 210 increases in size commensurate with the speed of retreat of the viewing position.

In addition to the contrast of appearance at the bar interface 218 between the past content bar 208 and the future content bar 210 in the buffer bar 206, the present position within the playback of the media content may be further indicated by a position indicator balloon 220 or similar visual element. As depicted in FIG. 2A, the position indicator balloon 220 may be situated above the state bar 202. A pointer 222 may extend downward from the position indicator balloon 220 in alignment with the bar interface 218 of the buffer bar 206. The position indicator balloon 220 may travel forward and backward along the length of the state bar 202 to maintain the position of the pointer 222 in line with the bar interface 218 in the buffer bar 206. Note, that in a state where there is no recorded content (not shown) there may be no buffer bar and the position indicator balloon 220 may be situated above and progress along the length of the state bar 202 indicating the elapsed time of the live program with respect to the program time slot.

The position indicator balloon 220 may also contain additional information for presentation to the user, including, for example, a program time indication 224 and a rate state indication 226. The program time 224 indicates the time elapsed from the start of the program based upon a starting point of zero. In the example of FIG. 2A, the program time 224 indicates 16 minutes and 48 seconds has elapsed since the beginning of the program at the position of the bar interface 218.

The rate state indicator 226 provides a visual indication of the playback rate of the media content presently being viewed, for example by using generally accepted symbols for playback states. The rate state indicator in FIG. 2A indicates playback of the present media content is presently paused (two vertical bars). Other possible indications appearing in the rate state position within the position indicator balloon 220 may include a play indicator (e.g., a right-pointing triangle), a fast forward indicator (e.g., two right-pointing arrowheads), a fast reverse indicator (e.g., two left-pointing arrowheads), and multiple speeds thereof (e.g., 1×, 2×), as well as other trick functions. Note that the position indicator balloon 220 may be designed to dynamically expand or contract as program time indicator 224 increases or decreases requiring greater or fewer digits in the time presentation.

The record indicator 228 previously identified above indicates that the program presently being presented is being recorded for later playback. The record indicator 228 may be in the form of yet another contrasting color, pattern, or other visual indicator on top of the background of the state bar 202. In one embodiment, the record indicator may be presented brightly when the DVR or other device is recording the program and may be dimmed or removed from the state bar 202 when the DVR is not recording. The record indicator 228 provides an easily identifiable indication of whether an associated DVR is recording present broadcast program content in addition to the rightward expansion of the buffer bar 206. The record indicator 228 may be desirable because the expansion of the buffer bar 206 may be hard to discern due to the potentially slow advancement of the edge of the future buffer bar 206.

FIG. 2B depicts an alternate state of an implementation of the media state UI 200 similar to that depicted in FIG. 2A. As previously described, the state bar 202 provides a background for a buffer container 204, which further defines the boundaries for the position of a buffer bar 206. The program start time indicator 212 is positioned within the state bar 202 at the left end of the buffer container 204. Similarly, the program end time indicator 214 is positioned within the state bar 202 at the right end of the buffer container 204. Further to the right of the program end time indicator 214, the clock is displayed within the state bar 202 to provide an indication to the viewer of the actual time. Also within the state bar 202 are a record indicator 228' and an icon 230. Note in the in the implementation of FIG. 2B, the record indicator 228' is depicted with two shadow indicators in addition to the main indicator circle. Shadow marks in conjunction with the record indicator 228' (or some other distinctive graphic indicator) may be used to indicate to the viewer that the program being recorded is one of a series of related programs pre-scheduled for regular recording by the DVR.

Again, the position indicator balloon 220 is positioned above the state bar 202. The position indicator balloon 220 includes a pointer 222, program time indicator 224, and a rate state indicator 226. Note that in the implementation of FIG. 2B, the buffer bar 206 is composed entirely of a past content bar 208. There is no future content bar. The bar interface 218 is indicated by the intersection of the color of the past content bar 208 and the underlying color of the buffer container 204. As shown in FIG. 2B, the pointer 222 of the position indicator balloon 220 is positioned in line with the bar interface 218 between the past content bar 208 and the contrasting color of the buffer container 204. Note also that the rate state indicator 226 in the position indicator balloon 220 is in a play state indicating that the program is presently being presented to the viewer. Because there is no future content bar 210, and recognizing that the minute place holder on the clock 216 corresponds to the minutes elapsed in the program time indicator 224, the viewer should recognize that he is viewing a live broadcast program in real time.

An additional possible state of the media state UI 200 is also depicted in FIG. 2B. The second position indicator balloon 220' is shown in phantom to indicate a possible alternate position of the position indicator balloon if the user were to fast reverse or otherwise jump to the beginning of the program. The placement of the position indicator balloon 220' indicates that the actual beginning point of recorded content is 59 seconds into the time period of the program time slot as indicated by the program time indicator 224'. Such delay in initiation of a recording within a program time slot may be common if the DVR extracts recording information from an EPG. Many EPG's are so exacting that they even take into account scheduled commercial break periods between programs and thereby provide a DVR the ability to begin recording at the conclusion of any commercials preceding a scheduled program.

Thus, for any particular program, the position indicator balloon 220' may not be positioned any further left than the actual point in the program time slot (as indicated by the buffer container 204) that the recording of a particular program began. This position is indicated across the buffer bar 206 in FIG. 2B by the dashed EPG start line 232. However, the buffer bar 206 may be smoothed to extend all the way to the left edge of the buffer container 204 to indicate to a viewer that the entirety of the desired program was actually recorded.

Although not depicted in FIG. 2B for the sake of clarity, if the position indicator balloon was actually positioned at the EPG start line 232, the entire buffer bar 206 would be shown as future buffer content rather than past buffer content as depicted in FIG. 2B by using the color of the future buffer bar 210 only. Further, as soon as playback begins from the EPG start line 232, the buffer bar 206 may immediately change such that the buffer bar 206 to the left of the pointer 222' may be reflected as past buffer content by the past buffer bar and the buffer bar 206 to the right of the pointer 222' may be shown as future buffer content by the future buffer bar.

FIG. 3A depicts yet another alternate state of an implementation of a media state UI 300 similar to that depicted in FIG. 2A. As previously described, the state bar 302 provides a background for a buffer container 304, which further defines the boundaries for the position of a buffer bar 306. The program start time indicator 312 is positioned within the state bar 302 at the left end of the buffer container 304. Similarly, the program end time indicator 314 is positioned within the state bar 302 at the right end of the buffer container 304. Further to the right of the program end time indicator 314, the clock is displayed within the state bar 302 to provide an indication to the viewer of the actual time. Also within the state bar 302 are a record indicator 328 and an icon 330. The position indicator balloon 320 is positioned above the state bar 302. The position indicator balloon 320 includes a pointer 322, program time indicator 324, and a rate state indicator 326. In this state example, the rate state indicator 326 indicates that the media source is in a playback mode.

In the state shown in FIG. 3A, the past buffer bar 308 extends to the left to the end of the buffer container 304. This indicates that the media content is recorded and stored (e.g., in a buffer of a DVR) at least as far back as the beginning of the present program time slot indicated by the buffer container 304 and the program start time and program end time indicators 312, 314. However, it may be that media content has been recorded even farther back than the present program time slot. This potentiality is indicated graphically in FIG. 3B, wherein the length of the past buffer bar 308 is schematically shown to extend beyond the program start slot 332 denoted by the buffer container 304 to a negative buffer offset point 334. Thus, if the media state UI 300 were to show the entire length of recorded content, the buffer bar 306 would extend an additional half-hour, as indicated by the 10:30 time stamp, to the reveal the negative buffer offset within the buffer container 304. However, in the context of the design of the media state UI 300, presentation of the buffer bar 306 is limited to that portion which fits within the pertinent program time slot. Therefore, if a viewer reverses play, fast reverses, or skips to a section of recorded media content that is outside the present program time slot, the state bar 302 may be reconfigured to reflect that the current viewing position is now in a different program time slot.

An exemplary reconfiguration of a media state UI 300' is depicted in FIG. 3C. Note that the length of the buffer container 304 remains constant within the media state bar 302 between the state in FIG. 3A and the state in FIG. 3C. However, the length of the program time slot has changed from an hour to a half-hour as indicated by the difference between the program start time indicator 312' and the program end time indicator 314'. In this manner, the size of the media state bar 302 remains constant regardless of the length of a program time slot. However, the length of the buffer bar 306' is significantly visually elongated as compared to the visual length of the buffer bar 308 in FIG. 3B for an equivalent amount of recorded content. Note that the buffer bar 306 and/or the position of the bar interface 318 will appear to change (e.g., expand or move) at a faster rate in a short program time slot than in a long program time slot.

As noted, in the example of FIG. 3C, the viewer has reversed play to move from the state of FIG. 3A to a prior program time slot. The past buffer bar 308' extends most of the length of the buffer container 304 and abuts the left end of the buffer container 304. The future buffer bar 310' extends to the right end of the buffer container 304 and additional recorded content is shown schematically in FIG. 3C to extend beyond the program end slot 336 denoted by the buffer container 304 to a positive buffer offset point 338. This positive buffer offset corresponds to the media content being recorded in real time as indicated by a comparison between the time on the clock 316 in FIG. 3A and the time stamp of 11:15 at the positive buffer offset point 338 in FIG. 3C, which coincide. A relocated position indicator balloon 320' in FIG. 3C is further positioned in line with the relocated bar interface 318'. The program time 324' in the position indicator balloon 320' reflects the relationship of the present viewing position at the bar interface 318' within the shorter, half-hour program time slot.

In one implementation of the media state UI 300, the change of the media state bar 302 from one program time slot to another may be animated. For example, in comparing FIG. 3A to FIG. 3C, when transitioning into past buffered content not within the present program time slot, the left end of the buffer bar 306 in the buffer container 304 may slide to the right side of the media state bar 302, pulling along the negative offset buffer indicated in FIG. 3B. The value in the program start time 312 position may also be shown as part of the animation being pushed along the seek bar 302 in front of the buffer bar 306 to ultimately replace the program end time 314 value on the right side of the media state bar 302. A new program end time 312' may slide into place or simply appear on the left side of the media state bar 302. The position indicator balloon 320 may similarly be animated to slide with the bar interface 318 until it reaches a new location corresponding to the relocated bar interface 318'. The relocated position indicator balloon 320' depicts an updated program time 324' reflective of the current viewing position of the buffered media content within the new program time slot. An opposite animation sequence may be implemented when transitioning into future buffered content not within the present program time slot.

FIG. 4 depicts yet another state of the media state UI 400 and its handling of a transition between viewing a first broadcast media and a second broadcast media source. As shown in FIG. 4, the recorded content in the buffer bar 406 extends into the past beyond present program time slot indicated by the left edge of the buffer container 404. This past buffered content is represented schematically as a past content bar 408 in a buffer container 404' for a prior program time slot. The recorded media content for the present program time slot is represented only by the future content bar 410 in the media state bar 402. Note that the prior program time slot was recorded on a first broadcast channel, e.g., Channel 2, while the media content within the present program time slot was recorded on a second, different channel, e.g., Channel 9.

The pointer 422 of the position indicator balloon 420 is positioned at the beginning of recorded content in the buffer bar 406. However, as discussed with respect to FIG. 2C, the pointer 422 may not be positioned at the left edge of the buffer container 404, even if the buffer bar 406 extends to the left edge of the buffer container 404, if recording of the media content actually started at some point after the start of the program time slot. In the case of FIG. 2C, this incongruity was due to information from an EPG identifying a commercial period and delaying recording until after the commercials aired. In the case shown in FIG. 4, the program time indicator 424 in the position indicator balloon 420 indicates a time of 5 seconds after the nominal program start time 412 of 11:00 for the program time slot. This incongruity is due to the time lag needed for a tuner to switch from one channel to another, for example, if the user has programmed a DVR to record a first program on Channel 2 and a second program on Channel 9 in the program time slot immediately following the program time slot of the first program.

As indicated in the example of FIG. 4, the tuner transition from Channel 2 to Channel 9 begins at dashed line 440, which is the end of a first time slot and the beginning of a second time slot. The tuner transition ends at dashed line 442, which coincides with the location of the pointer 422 of the position indicator balloon 420. The area between dashed line 440 and dashed line 442 is a smoothing area 444 over which the buffer bar 406 is extended to reach the edge of the buffer container 404. Again, this smoothing of the buffer bar 406 may be implemented to indicate to the viewer that the program was recorded from the beginning of the program time slot (to the extent that it physically could be recorded) and that no media content is missing.

An alternate implementation of a media state UI 500 is depicted in FIG. 5A for playback of prerecorded media, for example, movies or other videos or music from DVDs, CDs, or from a storage location within the media network. As in previous implementations, the state bar 502 provides a background for a buffer container 504, which further defines the boundaries for the position of a buffer bar 506. A start time indicator 512 is positioned within the state bar 502 at the left end of the buffer container 504. In this implementation, the media content is not tied to an EPG program time slot for broadcast media and thus operates within a time span mode rather than a date/time mode. In a time span mode any time values may be expressed as a time-from-zero, so the start time indicator 512 may merely be set at 0:00. A program end time indicator 514 is positioned within the state bar 502 at the right end of the buffer container 504. Again, because the entire media program is prerecorded and not tied to an EPG, the program end time indicator 514 may merely indicate the length of the program, which in the example of FIG. 5A is one hour.

Further to the right of the program end time indicator 514, the clock is displayed within the state bar 502 to provide an indication to the viewer of the actual time. Also within the state bar 502 is an icon 530. In this implementation, there is no need for a record indicator because the entire media program is prerecorded. The position indicator balloon 520 is positioned above the state bar 502. The position indicator balloon 520 includes a pointer 522, program time indicator 524, and a rate state indicator 526. The program time indicator 524 indicates the elapsed time of playback at the location of the pointer 522. In this state example, the rate state indicator 526 indicates that the media source is in a playback mode.

The buffer bar 506 may be presented within the buffer container 204 and may be composed of one or both of two visual elements. A first visual element represents a past content bar 508 and a second visual element represents a future content bar 510. Each of the past content bar 508 and the future content bar 510 may appear as contrasting bars of color that reside within the buffer container 504 and may extend to fill the full height of the buffer container 504. In this implementation, the buffer bar 506 will fill the entire length of the buffer container 504 and may completely obscure the contrasting color of the buffer container 504.

As shown in FIG. 5A, the right edge of the past content bar 508 abuts the left edge of the future content bar 510 such that the contrasting colors defining the past content bar 508 and the future content bar 510 meet at a bar interface 518. The bar interface 518 thus indicates a current viewing position and functions as a visual indicator to the viewer of the current playback position within the recorded media content presently being viewed. The position indicator balloon 520 may travel forward and backward along the length of the state bar 502 to maintain the position of the pointer 522 in line with the bar interface 518 in the buffer bar 506. In this implementation, at initiation of playback of the media from 0:00 elapsed time, the pointer 522 of the position indicator balloon 520 will be aligned with the left edge of the buffer container 504 and the buffer bar 506 will appear entirely as a future content bar 510. Similarly, at the conclusion of playback of the media at 1:00 elapsed time, the pointer 522 of the position indicator balloon 520 will be aligned with the right edge of the buffer container 504 and the buffer bar 506 will appear entirely as a past content bar 508.

In one alternate implementation of a media state UI, a buffer container may be shaped in a configuration other that as a simple rectangle as shown in FIG. 5A and the previous figures. In FIG. 5B the buffer container 504' may be rounded on each lateral end. Thus, when recorded media is being played back, the buffer bar 506' may likewise be rounded at each lateral end to fit to the curve of the buffer container 504. (This may always be the case with pre-recorded media, but not necessarily the case when buffering live broadcast media because the buffered portion may not be near the beginning or end of the program time slot.)

In the example of FIG. 5B, the bar interface 518' may be vertical in orientation until the bar interface 518' approaches a lateral end of the bar container 504'. As the bar interface 518' enters a region of rounding of the bar container 518', the bar interface 518' may be animated or constrained to mimic the curvature of the bar container 504 to provide an aesthetically pleasing, polished look to the media state UI. Similarly (although not depicted), as a buffer bar grows when recording live broadcast content, the future content bar of the buffer bar may be animated or constrained to mimic the curvature of the bar container as the right end of the buffer bar approaches the end of the program time slot, regardless of the current playback position.

As shown in FIG. 5B, if the bar interface 518' is moving to the right during playback, the right end of the past content bar 508' may be curved convexly to the right, while the left end of the future content bar 510' may be curved convexly to closely interface with the past content bar 508' within the bounds of a rounded end of the buffer container 504'. It should be apparent (although not depicted) that opposite curvatures may be applied to the past content bar 508' and the future content bar 510' on the left end of the buffer container 504' during slow reverse play or other reverse functions applied to the media content. As previously described, the movement of the bar interface 518 may be incrementally controlled or otherwise smoothed to avoid flicker effects between the contrasting colors of the past content bar 508' and the future content bar 510'.

Figure 6:
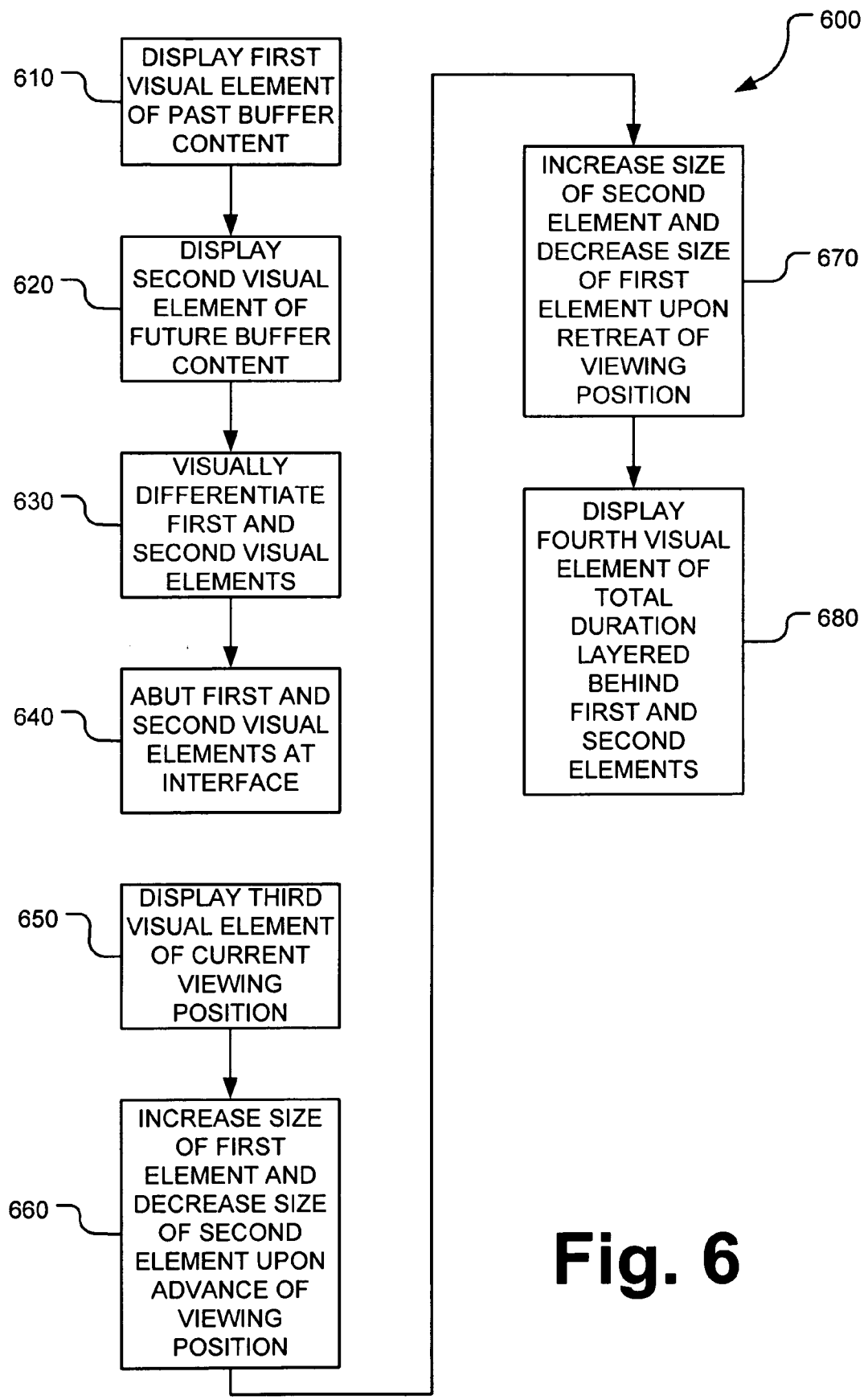
FIG. 6 is a flow diagram depicting a method for creating a media state UI.

FIG. 6 is a flow diagram illustrating a method 600 for implementing in software stored in a computer memory or on another computer readable medium, for example, as part of an application or operating system, a basic form of a media state UI of the types as described above. In a first displaying operation 610, a first visual element representing past buffer content of a recorded media file or program is displayed by the computer on a display device. Next, in a second displaying operation 620, a second visual element representing future buffer content of the media file or program is displayed on the display device. In a differentiation operation 630, the first visual element and the second visual element may be visually differentiated by contrasting colors or graphic patterns. In an abutting operation 640, an edge of the first visual element is abutted against an edge of the second visual element to form an interface that is visually perceptible. As described above, the interface indicates a present position of functional access to the recorded media content. For example, the interface may indicate a present playback position, a pause position, or a present position during a fast forward, fast reverse, or other trick function moving through time increments of the media.

In addition to the first and second visual elements, in a third displaying operation 650, a third visual element may be displayed to additionally indicate a current viewing position. In the examples of FIGS. 2A-5A above, the third visual element may be represented by the position indication balloon.

The presentation of the media state UI may be dynamically altered based upon user input to the computer system or a related media playback device. In a first increasing operation 660, the size of the first element may be increased while the size of the second element may be decreased in response to an advancement of the viewing position through the buffered content. Alternately, in a second increasing operation 670, the size of the second element may be increased while the size of the first element may be decreased in response to a retreat of the viewing position through the buffered content.

In a fourth displaying operation 680, a fourth visual element may additionally be displayed by the computer on the display device. The fourth visual element may represent the total duration of the media content, including both prerecorded and live portions of the media content. The fourth visual element may again be of a contrasting color or graphic design to visually distinguish the fourth visual element from the first and second visual elements. The fourth visual element may also be layered behind the first and second visual elements within the presentation on the display device.

Figure 7:
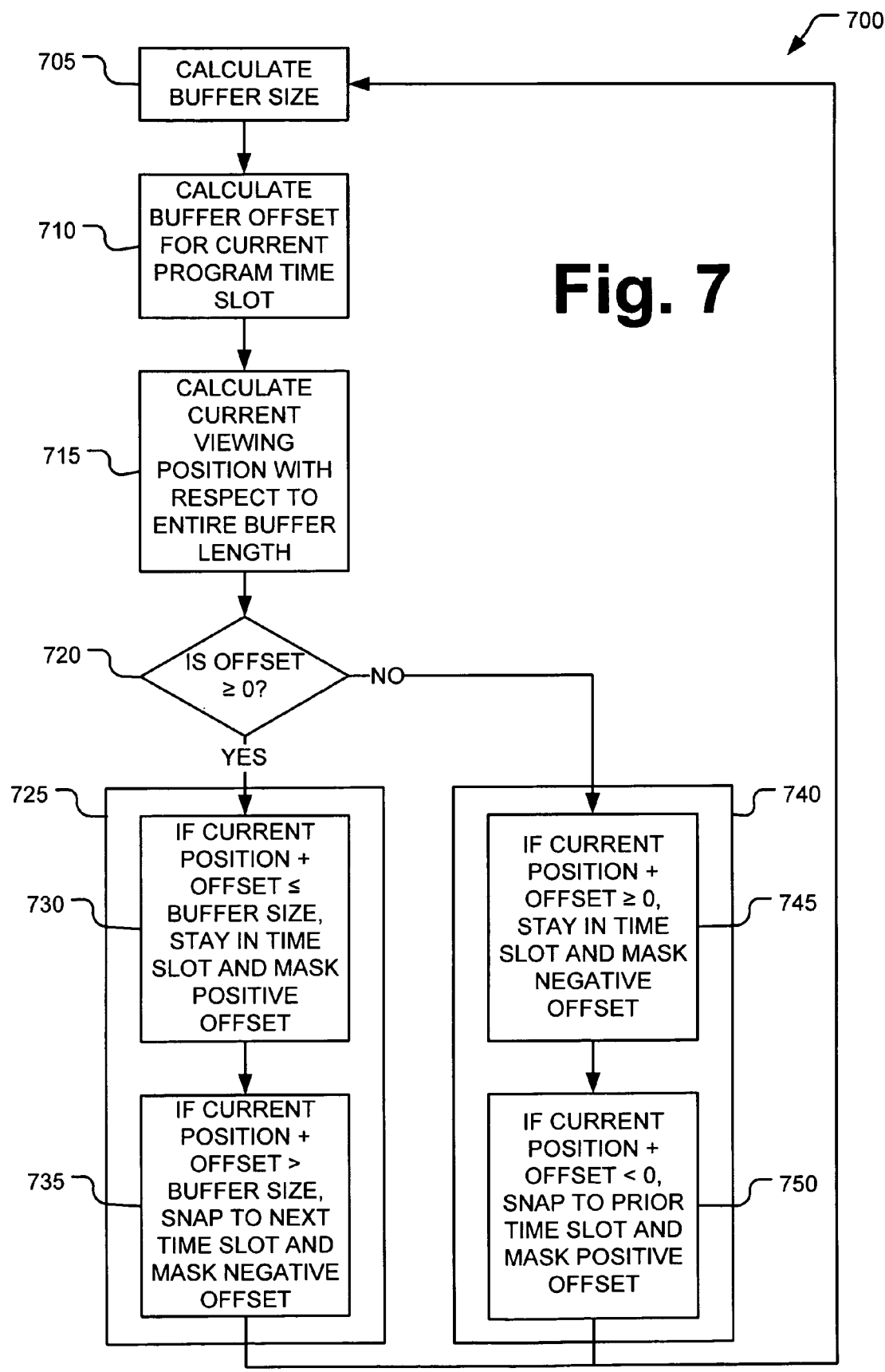
FIG. 7 is a flow diagram depicting a method for determining an appropriate program time slot to depict within the media state UI.

As described above, when presenting broadcast programming, whether the programming is presently live, or partially or fully prerecorded in a buffer, the media state UI may represent the media program in the context of a program time slot. In order to determine the appropriate time slot to display, a set of logic steps stored in a software application or operating system may be implemented to choose between adjacent tome slots. An exemplary time slot selection methodology 700 is depicted in the flow diagram of FIG. 7.

The program time slot selection method 700 begins with a first calculating operation 705 in which the entire buffer size is calculated. Next, in a second calculating operation 710, a buffer offset is calculated with respect to the current time slot. As discussed earlier with respect to FIGS. 3A-3C, the buffer offset may be a negative value depending upon whether the beginning of the buffer extends to include media content related to program time slots earlier or later than the current program time slot. Further, in a third calculation operation 715, the current viewing position is calculated with respect to the entire buffer length.

Once these calculation operations have been performed, an analysis of the buffer offset may be undertaken. In a first decision operation 720, a comparison is made as to whether the buffer offset is greater than or equal to zero. If the buffer offset is greater than or equal to zero, a fourth calculation operation 725 is undertaken to compare the buffer size to the current position and the buffer offset. In a first comparison operation 730, if the value of the sum of the buffer offset and the current position is less than or equal to the buffer size, then the current position is within the presently presented program time slot. The future content bar of the buffer bar may be truncated or masked by the buffer container to hide the positive offset. In a second comparison operation 735, if the value of the sum of the buffer offset and the current position is greater than the buffer size, then the current position has moved into a future program time slot. The media state UI may then transform in state to depict the future program time slot and any past content bar portion of the buffer bar may be truncated or masked by the buffer container to hide the now negative offset. Once the fourth calculation operation 725 is complete, the process returns to the first calculation operation 705 to be performed at the next time increment.

If in decision operation 720 it is determined that the buffer offset is less than zero, a fifth calculation operation 740 may be undertaken to compare the buffer size to the current position and the buffer offset. In a third comparison operation 745, if the value of the sum of the buffer offset and the current position is greater than or equal to zero, then the current position is within the presently presented program time slot. The past content bar of the buffer bar may be truncated or masked by the buffer container to hide the negative offset. In a fourth comparison operation 750, if the value of the sum of the buffer offset and the current position is less than the zero, then the current position has moved into a past program time slot. The media state UI may then transform in state to depict the past program time slot and any future content bar portion of the buffer bar may be truncated or masked by the buffer container to hide the now positive offset. Once the fourth calculation operation 740 is complete, the process returns to the first calculation operation 705 to be performed at the next time increment.

Figure 8:
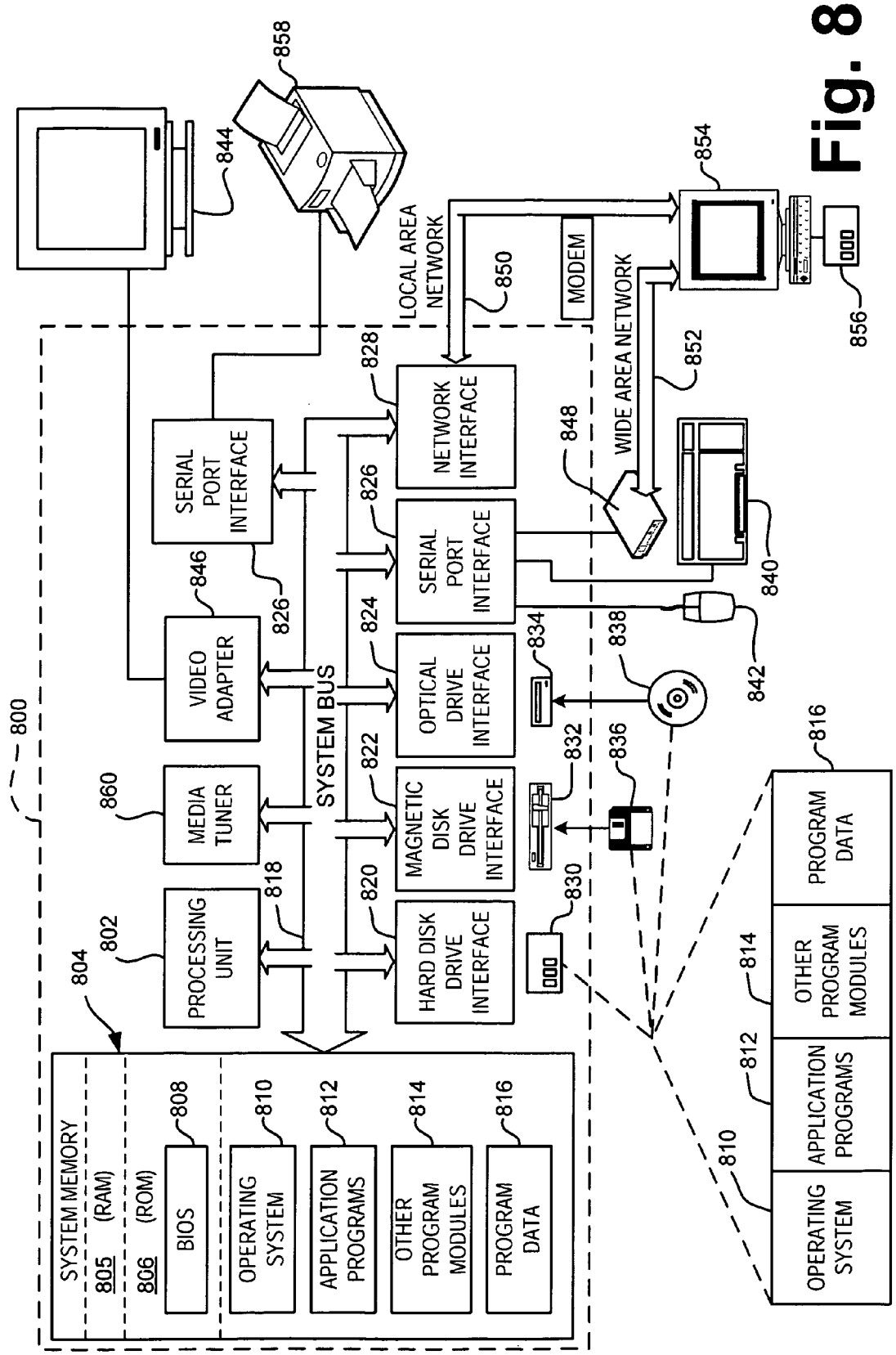
FIG. 8 is a schematic diagram of a computer system that may operate as a media server or other computer component of a system for presenting media using a seekbar UI.

FIG. 8 illustrates an exemplary computer system 800, including hardware and operating environment, for implementing the invention. For example, each of the media server and media receivers described with respect to FIG. 1 may each be based upon a general purpose computer system 800, including a processing unit 802, a system memory 804, and a system bus 818 that operatively couples various system components, including the system memory 804 to the processing unit 802. There may be only one or there may be more than one processing unit 802, such that the processor of the computer system 800 comprises a single central processing unit (CPU), or a plurality of processing units, commonly referred to as a parallel processing environment. The computer system 800 may be a conventional computer, a distributed computer, or any other type of computer.

The system bus 818 may be any of several types of bus structures including a memory bus or memory controller; a peripheral bus; switched fabric, point-to-point connections; or a local bus using any of a variety of bus architectures. The system memory 804 may also be referred to as simply the memory, and includes read only memory (ROM) 806 and random access memory (RAM) 805. A basic input/output system (BIOS) 808, containing the basic routines that help to transfer information between elements within the computer 800, such as during start-up, is stored in ROM 806. The computer 800 may further include a hard disk drive 830 for reading from and writing to a hard disk (not shown), a magnetic disk drive 832 for reading from or writing to a removable magnetic disk 836, and an optical disk drive 834 for reading from or writing to a removable optical disk 838 such as a CD ROM or other optical media.

The hard disk drive 830, magnetic disk drive 832, and optical disk drive 834 may be connected to the system bus 818 by a hard disk drive interface 820, a magnetic disk drive interface 822, and an optical disk drive interface 824, respectively. The drives and their associated computer-readable media provide nonvolatile storage of computer-readable instructions, data structures, program modules and other data for the computer 800. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 830, magnetic disk 832, optical disk 834, ROM 806, or RAM 805, including an operating system 810, one or more application programs 812, other program modules 814, and program data 816. In an exemplary implementation, the seekbar UI as described herein, may be incorporated as part of the operating system 810, application programs 812, or other program modules 814.

A user may enter commands and information into the personal computer 800 through input devices such as a keyboard 840 and pointing device 842, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 802 through a serial port interface 826 that is coupled to the system bus 818, but may be connected by other interfaces, such as a parallel port, game port, or a universal serial bus (USB).

A monitor 844 or other type of presentation device may also be connected to the system bus 818 via an interface, such as a video adapter 846. In addition to the monitor 844, computers typically include other peripheral output devices, such as a printer 858 and speakers (not shown). These and other output devices are often connected to the processing unit 802 through the serial port interface 826 that is coupled to the system bus 818, but may be connected by other interfaces, such as a parallel port, a game port, or a universal serial bus (USB). A media tuner module 860 may also be connected to the system bus 818 to tune audio and video programming (e.g., TV programming) for output through the video adapter 846 or other presentation output modules.

The computer system 800 may operate in a networked environment using logical connections to one or more remote computers, such as remote computer 854. In the context of the present disclosure, such a connection may be between a media server and a media receiver. These logical connections may be achieved by a communication device coupled to or integral with the computer system 800. The computer systems used in implementing the present invention are not limited to using a particular type of communications device. The remote computer 854 may be another computer, a server, a router, a network personal computer, a media receiver, a client, a peer device, or other common network node, and typically includes many or all of the elements described above relative to the computer system 800, although only a memory storage device 856 has been illustrated in FIG. 8. The logical connections depicted in FIG. 8 include a local-area network (LAN) 850 and a wide-area network (WAN) 852. Such networking environments are commonplace in office networks, enterprise-wide computer networks, intranets and the Internet, which are all types of networks.

When used in a LAN 850 environment, the computer 800 may be connected to the local network 850 through a network interface or adapter 828, e.g., Ethernet or other communications interfaces. When used in a WAN 852 environment, the computer system 800 typically includes a modem 848, a network adapter, or any other type of communications device for establishing communications over the wide area network 852. The modem 848, which may be internal or external, is connected to the system bus 818 via the serial port interface 826. In a networked environment, program modules depicted relative to the computer system 800, or portions thereof, may be stored in a remote memory storage device. It should be appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularly, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for execution in a computer system for rendering on a display device a user interface for representing a current playback position and availability of stored media content in the presentation of media content, the method comprising:
    rendering a buffer container in the user interface, the buffer container indicating a duration of a time slot for the media content;
    rendering a buffer bar within the buffer container, the buffer bar indicating an amount of available stored media content and comprising a first visual element and a second visual element within the buffer bar, the second visual element being visually distinguishable from the first visual element;
    rendering the first visual element of the buffer bar in a first color or pattern for visually distinguishing available stored media content ahead of the current playback position;
    rendering the second visual element of the buffer bar in a second color or pattern contrasting with the first color or pattern for visually distinguishing available stored media content behind the current playback position;
    abutting adjacent ends of the first visual element and the second visual element that are rendered in contrasting colors or patterns, wherein:
        a left end of the first visual element that is rendered in the first color or pattern abuts a right end of the second visual element that is rendered in the second color or pattern to define an interface representing the current playback position,
        movement of the interface representing the current playback position is limited to incrementing or decrementing to predetermined pixel increments determined as percentages of the duration of the time slot to avoid a flicker effect between the first color or pattern of the left end of the first visual element and the second color or pattern of the right end of the second visual element, and
        the left end of the first visual element and the right end of the second visual element snap to the predetermined pixel increments based on elapsed playback time of the media content with respect to the duration of the time slot;
    decreasing size of the first visual element within the buffer bar and increasing size of the second visual element within the buffer bar as the current playback position advances in response to forward playback or input control; and
    decreasing size of the second visual element within the buffer bar and increasing size of the first visual element within the buffer bar as the current playback position retreats in response to reverse playback or input control.

2. The method of claim 1 further comprising
    rendering a position indicator adjacent to the buffer container that indicates the current playback position and the elapsed playback time of the media content.

3. The method of claim 2, wherein the position indicator comprises a playback rate indicator.

4. The method of claim 1 further comprising rendering a media state bar as a background to the buffer container.

5. The method of claim 4, wherein the media state bar includes a clock indicating actual time of day.

6. The method of claim 4, further comprising:
    determining whether the current playback position is within a current time slot by:
        calculating a sum of the elapsed playback time and a buffer offset corresponding to stored media content from an earlier or later time slot,
        when the buffer offset corresponds to stored media content from an earlier time slot, determining that the current playback position is within the time slot if the sum is greater than or equal to zero, and
        when the buffer offset corresponds to stored media content from a later time slot, determining that the current playback position is within the time slot if the sum is less than or equal to total buffer size;
    if the current playback position is within the time slot, masking the buffer offset corresponding to the stored media content from the earlier or later time slot; and
    if the current playback position is not within the time slot, reconfiguring the media state bar to represent an adjacent program time slot and reconfiguring the first visual element and the second visual element to reflect a revised current playback position within the adjacent program time slot.

7. A computer-readable storage medium having stored computer-executable instructions performing a computer process implementing the method of claim 1.

8. A method for execution in a computer system for rendering on a display device a user interface for representing a current playback position and availability of stored media content in the presentation of media content, the method comprising:
    rendering a media state bar of a base visual element in the user interface;
    rendering a buffer container in the media state bar, the buffer container indicating a duration of a time slot for the media content;

rendering a buffer bar indicating an amount of available stored media content and layered on top of the media state bar, the buffer bar further comprising:
  a past content bar rendered in a first color or pattern for visually distinguishing available stored media content behind the current playback position, and
  a future content bar visually distinguishable from the past content bar and rendered in a second color or pattern contrasting with the first color or pattern for visually distinguishing available stored media content ahead of the current playback position;
abutting adjacent ends of the future content bar and the past content bar that are rendered in contrasting colors or patterns, wherein:
  a right end of the past content bar that is rendered in the first color or pattern abuts a left end of the future content bar that is rendered in the second color or pattern to define a bar interface representing the current playback position,
  movement of the interface representing the current playback position is limited to incrementing or decrementing to predetermined pixel increments determined as percentages of the duration of the time slot to avoid a flicker effect between the first color or pattern of the right end of the past content bar and the second color or pattern of the left end of the future content bar, and
  the right end of the past content bar and the left end of the future content bar snap to the predetermined pixel increments based on elapsed playback time of the media content with respect to the duration of the time slot;
decreasing size of the past content bar within the buffer bar and increasing size of the future content bar within the buffer bar as the current playback position retreats in response to reverse playback or input control;
decreasing size of the future content bar within the buffer bar and increasing size of the past content bar within the buffer bar as the current playback position advances in response to forward playback or input control; and
rendering a position indicator visual element adjacent to the media state bar and dynamically aligned with the bar interface.

9. The method of claim 8, wherein the position indicator visual element further comprises a playback rate indicator.

10. The method of claim 8, wherein the position indicator visual element further comprises the elapsed playback time of the media content.

11. The method of claim 8, wherein the position indicator visual element further comprises a pointer member directly aligned with the bar interface.

12. The method of claim 8 further comprising restricting position of the bar interface to incrementing or decrementing every other pixel row and every other pixel column.

13. The method of claim 8 further comprising rendering the buffer container in a third color or pattern as a background to the buffer bar and a foreground to the media state bar.

14. The method of claim 13, wherein the user interface includes a clock indicating actual time of day within the media state bar.

15. The method of claim 8, further comprising:
  determining whether the current playback position is within a current time slot by:
    calculating a sum of the elapsed playback time and a buffer offset corresponding to stored media content from an earlier or later time slot,
    when the buffer offset corresponds to stored media content from an earlier time slot, determining that the current playback position is within the time slot if the sum is greater than or equal to zero, and
    when the buffer offset corresponds to stored media content from a later time slot, determining that the current playback position is within the time slot if the sum is less than or equal to total buffer size;
  if the current playback position is within the time slot, masking the buffer offset corresponding to the stored media content from the earlier or later time slot; and
  if the current playback position is not within the time slot, reconfiguring the media state bar to represent an adjacent program time slot and reconfiguring the buffer bar to reflect a revised current playback position within the adjacent program time slot.

16. A display device having rendered thereon a user interface for representing a current playback position and availability of stored media content in the presentation of media content, the user interface comprising:
  a buffer container indicating a duration of a time slot for the media content;
  a buffer bar within the buffer container indicating an amount of available stored media content;
  a first visual element within the buffer bar rendered in a first color or pattern for visually distinguishing available stored media content ahead of the current playback position; and
  a second visual element within the buffer bar visually distinguishable from the first visual element and rendered in a second color or pattern contrasting with the first color or pattern for visually distinguishing available stored media content behind the current playback position, wherein:
    a left end of the first visual element that is rendered in the first color or pattern and a right end of the second visual element that is rendered in the second color or pattern about to define an interface representing the current playback position,
    movement of the interface representing the current playback position is limited to incrementing or decrementing to predetermined pixel increments determined as percentages of the duration of the time slot to avoid a flicker effect between the first color or pattern of the left end of the first visual element and the second color or pattern of the right end of the second visual element,
    the left end of the first visual element and the right end of the second visual element snap to the predetermined pixel increments based on elapsed playback time of the media content with respect to the duration of the time slot,
    size of the first visual element decreases within the buffer bar and size of the second visual element increases within the buffer bar as the current playback position advances in response to forward playback or input control, and
    size of the second visual element decreases within the buffer bar and size of the first visual element increases within the buffer bar as the current playback position retreats in response to reverse playback or input control.

17. The display device of claim 16, wherein the user interface comprises a position indicator adjacent to the buffer container that indicates the current playback position and the elapsed playback time of the media content.

18. The display device of claim 17, wherein the position indicator comprises a playback rate indicator.

19. The display device of claim 17, wherein the user interface comprises a state bar as a background to the buffer container.

20. The display device of claim 19, wherein the media state bar includes a clock indicating actual time of day.

* * * * *

UNITED STATES PATENT AND TRADEMARK OFFICE
CERTIFICATE OF CORRECTION

| | | |
|---|---|---|
| PATENT NO. | : 7,827,490 B2 | Page 1 of 1 |
| APPLICATION NO. | : 11/606491 | |
| DATED | : November 2, 2010 | |
| INVENTOR(S) | : Jay Kapur et al. | |

It is certified that error appears in the above-identified patent and that said Letters Patent is hereby corrected as shown below:

In column 20, line 38, in Claim 16, delete "about" and insert -- abut --, therefor.

In column 21, line 4, in Claim 19, before "state" insert -- media --.

Signed and Sealed this

Fifteenth Day of February, 2011

David J. Kappos
*Director of the United States Patent and Trademark Office*